United States Patent
Klofer et al.

(10) Patent No.: US 9,719,832 B2
(45) Date of Patent: Aug. 1, 2017

(54) APPARATUS FOR DETERMINING OR MONITORING A PHYSICAL OR CHEMICAL, PROCESS VARIABLE

(71) Applicant: Endress + Hauser GmbH + Co. KG, Maulburg (DE)

(72) Inventors: Peter Klofer, Steinen (DE); Klaus Feisst, Aesch (CH)

(73) Assignee: Endress + Hauser GmbH + Co. KG, Maulburg (DE)

( * ) Notice: Subject to any disclaimer, the term of this patent is extended or adjusted under 35 U.S.C. 154(b) by 119 days.

(21) Appl. No.: 14/728,137

(22) Filed: Jun. 2, 2015

(65) Prior Publication Data
US 2015/0346016 A1    Dec. 3, 2015

(30) Foreign Application Priority Data
Jun. 3, 2014   (DE) .................. 10 2014 107 781

(51) Int. Cl.
G01F 23/284      (2006.01)
G01S 7/02        (2006.01)

(52) U.S. Cl.
CPC .............. *G01F 23/284* (2013.01); *G01S 7/02* (2013.01); *G01S 2007/027* (2013.01)

(58) Field of Classification Search
CPC ..................... G01F 23/284; G01S 2007/027
See application file for complete search history.

(56) References Cited

U.S. PATENT DOCUMENTS

| 5,337,289 A | 8/1994 | Fasching et al. |
| 8,597,174 B2 | 12/2013 | Sugiyama |
| 9,110,165 B2 | 8/2015 | Feisst et al. |
| 2004/0040843 A1* | 3/2004 | Weyl .................. G01N 27/4078 204/424 |
| 2007/0296626 A1 | 12/2007 | Gnedenko et al. |
| 2011/0051777 A1 | 3/2011 | Schlipf |
| 2014/0191135 A1* | 7/2014 | Partington .......... G01N 23/204 250/391 |

FOREIGN PATENT DOCUMENTS

| DE | 3303227 A1 | 8/1984 |
| DE | 10134640 C1 | 3/2003 |
| DE | 102009028620 A1 | 2/2011 |
| DE | 102012103493 A1 | 10/2013 |
| KR | 100803733 B1 | 2/2008 |

OTHER PUBLICATIONS

German Search Report, German PTO, Munich, Dec. 12, 2014.

* cited by examiner

*Primary Examiner* — Lisa Caputo
*Assistant Examiner* — Punam Roy
(74) *Attorney, Agent, or Firm* — Bacon & Thomas, PLLC

(57) ABSTRACT

The invention relates to an apparatus for determining or monitoring a physical or chemical, process variable, comprising a sensor element (2) having at least one temperature sensitive, sensor region and/or an electronics unit (3) having at least one component (4), whose specification requires use within a predetermined temperature range, wherein a connecting component (5) is provided between the temperature sensitive, sensor region and the remaining regions of the sensor element (2) and/or between the sensor element (2) and the electronics unit (3), wherein the connecting component (5) is composed at least partially of a metal- or ceramic foam (6) having a predetermined porosity.

5 Claims, 2 Drawing Sheets

APPARATUS FOR DETERMINING OR MONITORING A PHYSICAL OR CHEMICAL, PROCESS VARIABLE

TECHNICAL FIELD

The invention relates to an apparatus for determining or monitoring a physical or chemical, process variable, comprising a sensor element having at least one temperature sensitive, sensor region and/or an electronics unit having at least one component, whose specification requires use within a predetermined temperature range, wherein between the temperature sensitive, sensor region and the sensor element and/or between the sensor element and the electronics unit a connecting component is provided.

BACKGROUND DISCUSSION

Serving for registering process variables in automation technology are, for example, fill level measuring devices, flow measuring devices, pressure- and temperature measuring devices, analytical measuring devices, etc., which register corresponding process variables, fill level, flow, pressure, temperature, analytical data, such as pH-value, turbidity or conductivity. Measuring devices are composed essentially of a sensor element, which delivers information concerning the process variable, and at least one electronics unit, which activates the sensor element, conditions and/or evaluates information delivered by the sensor element and provides measured values of the process variable.

Measuring devices are applied in an industrial environment, frequently in a process environment, whose temperature lies significantly above the maximum allowable temperature of the temperature sensitive components of the sensor element or the electronics unit. In order to avoid destruction of a temperature sensitive component, which usually leads to the failure of the measuring device, there is provided, for example, between the sensor element, which with the process, and the electronics unit having the temperature sensitive component, a connecting component, whose thermal resistance is sufficiently high that the sensor element and the electronics unit are thermally decoupled from one another to the required degree.

Moreover, measuring devices in the case of use in the chemical or pharmaceutical industry, however, also in the foods field, are, e.g. due to cleaning processes, often subjected to rapid temperature changes sequentially following one another. As a result of rapid temperature changes, high temperature gradients are present, at least for a short-time. These temperature gradients only disappear after thermal equilibrium has been achieved between measuring device and process. Since measuring device are manufactured of different materials with different coefficients of expansion, mechanical stresses occur in the measuring device. In the worst case, temperature fluctuations or temperature gradients lead to fracture or gap formation on or in the measuring device.

Due to different design conditions, such as e.g. required pressure resistance and/or electrical conductivity, it is often necessary in the case of industrial applications to manufacture the thermally decoupling connecting component of a material, which has the properties of metal as regards strength and conductivity. The usually high thermal conductivity of metals opposes, in principle, the desired thermal decoupling. In the state of the art, it is attempted to achieve a high thermal resistance and therewith a good thermal decoupling via the geometry of the connecting component. Especially, a desired thermal resistance can be implemented by a suitable cross-section reduction and/or a suitable increasing of the length of the connecting component.

Disadvantageous in the case of known solutions is that it is difficult to achieve a compact embodiment of a measuring device, when for the purpose of thermal decoupling a connecting component with increased length is used. Also, a cross-section reduction has its limits, since, below a certain cross section of the connecting component, the mechanical stability required at the industrial location of use of the measuring device is no longer assured.

Known from German patent, DE 10 2009 028 620 A1 is a measuring device for monitoring the fill level of a fill substance in a container. This measuring device is so embodied that it is suitable for a high temperature process. The high temperature range is specified in connection with the invention as temperatures above 150° C. The measuring device is composed of a sensor element located in the process and a measurement transmitter located outside of the container.

The embodiment of the temperature reduction unit 18 shown in FIG. 1 is based on FIG. 3 of DE 10 2009 028 620 A1. Via the coupling unit 17, the high-frequency measurement signals are coupled into a hollow conductor 20, respectively coupled out of the hollow conductor 20. The measurement signals are generated in a signal producing unit (not shown in FIG. 1). Arranged in the hollow conductor 20 is a dielectric process isolator 19, which prevents that particles from the process migrate into the electronics unit (not shown). The process isolation 19 is so embodied that the electromagnetic measurement signals guided in the hollow conductor 20 are influenced as a little as a possible.

High thermal resistance is achieved at the temperature reduction unit 18 of the known solution via a slimming of the diameter. Additionally, the temperature reduction unit 18 includes cooling fins. Temperature reduction unit 18 is so embodied that the required temperature reduction between the temperature in the process and the ambient temperature in the space outside of the container where the process transpires, is assured.

Known from German patent, DE 1012 103 493 A1 is another embodiment of a fill-level measuring device suitable for high temperature applications. High-frequency measurement signals with a frequency greater than or essentially equal to 26 GHz are transmitted via an antenna unit in the direction of the surface of a fill substance located in a container, and the echo signals reflected on the surface of the fill substance are received via the antenna unit. In a fill substance facing end region of the hollow conductor guiding the high-frequency measurement signals, a first, gas-sealed, process isolation is provided. This is at least partially manufactured of a ceramic material and is so embodied that it passes the measurement signals almost reflection freely. Further provided in the hollow conductor is a second gas tight, ceramic process isolation, which is so embodied that it passes the high-frequency measurement signals, on the one hand, almost reflection freely, and, on the other hand, withstands a higher mechanical load than the first process isolation. A temperature reduction unit surrounds a portion of the hollow conductor radially and is arranged in a region between the second process isolation and the control/evaluation unit. Also here, the temperature reduction unit is so embodied that the temperature sensitive components in the control/evaluation unit are exposed to temperatures, which lie within their working range.

In order purposefully to counteract the high temperature gradients, which occur before reaching thermal equilibrium, sensitive components in the state of the art are—such as already stated—thermally decoupled from the insensitive measuring device components. A suitable thermal coupling is achieved via a corresponding adapting of the geometry of the connecting component. Further known for thermal decoupling are also double walled structures with an enclosed, thermally insulating, air layer. Corresponding insulating connecting components are, however, relatively complex to manufacture and, consequently, correspondingly expensive.

SUMMARY OF THE INVENTION

An object of the invention is to provide a compact measuring device for use at high temperatures.

The object is achieved by features including that the connecting component between the temperature sensitive component of the measuring device and a little or non-temperature sensitive component of the measuring device is composed at least partially of a foamed metal or a foamed ceramic having a predetermined porosity.

Porosity is defined by the ratio of hollow volume (usually occupied by air) to the total volume of the porous material or mixture of materials. If the hollow spaces are connected with one another and with the environment, then one speaks of open porosity of the material, respectively of open pore material. If the hollow spaces are neither connected with one another nor with the environment, then one speaks of closed porosity of the material, respectively of closed pore material.

The measuring device of the invention is distinguished by an adaptable thermal decoupling between the at least one temperature sensitive component and the one or more temperature resistant components of the measuring device. This is achievable even when the temperature differences, to which individual portions of the measuring device are exposed, are very large. Thus, for example, a temperature of 280° C.-450° C. can reign in the process, while outside of the container, in which the process transpires, the usual ambient temperature is present. Already mentioned above are the high temperature gradients, which occur during a cleaning or sterilization process.

Preferably, the connecting component is arranged between the sensor element and an electronics unit located removed from the sensor element. The temperature sensitive component can, however, likewise thermally decouple a temperature sensitive region of the sensor element from a less- or non-temperature sensitive region of the sensor element. Since the features of an increased length of the thermal decoupling connecting component as known from the state of the art, often combined with a cross-section reduction, do not need to be used, the apparatus of the invention has a relatively compact construction. Via choice of material of the connecting component, moreover, the mechanical stability required in automation technology can be achieved.

In an advantageous embodiment of the apparatus of the invention, it is provided that the porosity of the foamed metal or the foamed ceramic is so selected that the connecting component has a predetermined, low thermal conductivity. As already mentioned above, the mechanical stability of the connecting component must always be assured. Therefore, it is alternatively and or, depending on case of application, additionally provided that the porosity of the foamed metal or the foamed ceramic is so selected that the connecting component has a predetermined mechanical stability.

A preferred embodiment of the apparatus of the invention provides that the sensor element is arranged in an application of process automation technology and therewith is exposed to a process temperature, while the electronics unit or the temperature sensitive, sensor region is arranged outside of the process and therewith is exposed to a temperature different from the process temperature. The porosity of the connecting component is so selected that the sensor element and the electronics unit, respectively the sensor element and the temperature sensitive, sensor region, are thermally decoupled from one another in such a manner that the electronic component, respectively the temperature sensitive, sensor region, experiences a temperature, which lies in the temperature range, which is specified for the electronic component, respectively the temperature sensitive component.

Preferably, the connecting component is composed of a closed pore metal- or ceramic foam. Alternatively, it is provided that the connecting component is composed of an open pore metal- or ceramic foam and that at least one surface region of the connecting component facing the environment is provided with a protective layer of a metal or a ceramic. Alternatively, the protective layer is composed of a closed pore metal- or ceramic foam. This embodiment assures that no particles of the process can migrate into the connecting component and the measuring device.

The applied materials are so selected that they are optimally suitable for the conditions predetermined by the process. Especially, an option is to use previously applied materials, since they already fulfill conditions predetermined by the process. The terminology, conditions predetermined by the process, means in connection with the invention especially pressure resistance, electrical conductivity, thermal durability and chemical durability. A foamed metal or a foamed ceramic continues to have the same physical or chemical properties as the untreated metal, respectively untreated ceramic, however, air in the pores has a considerable influence on the thermal conductivity of the material.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 2:
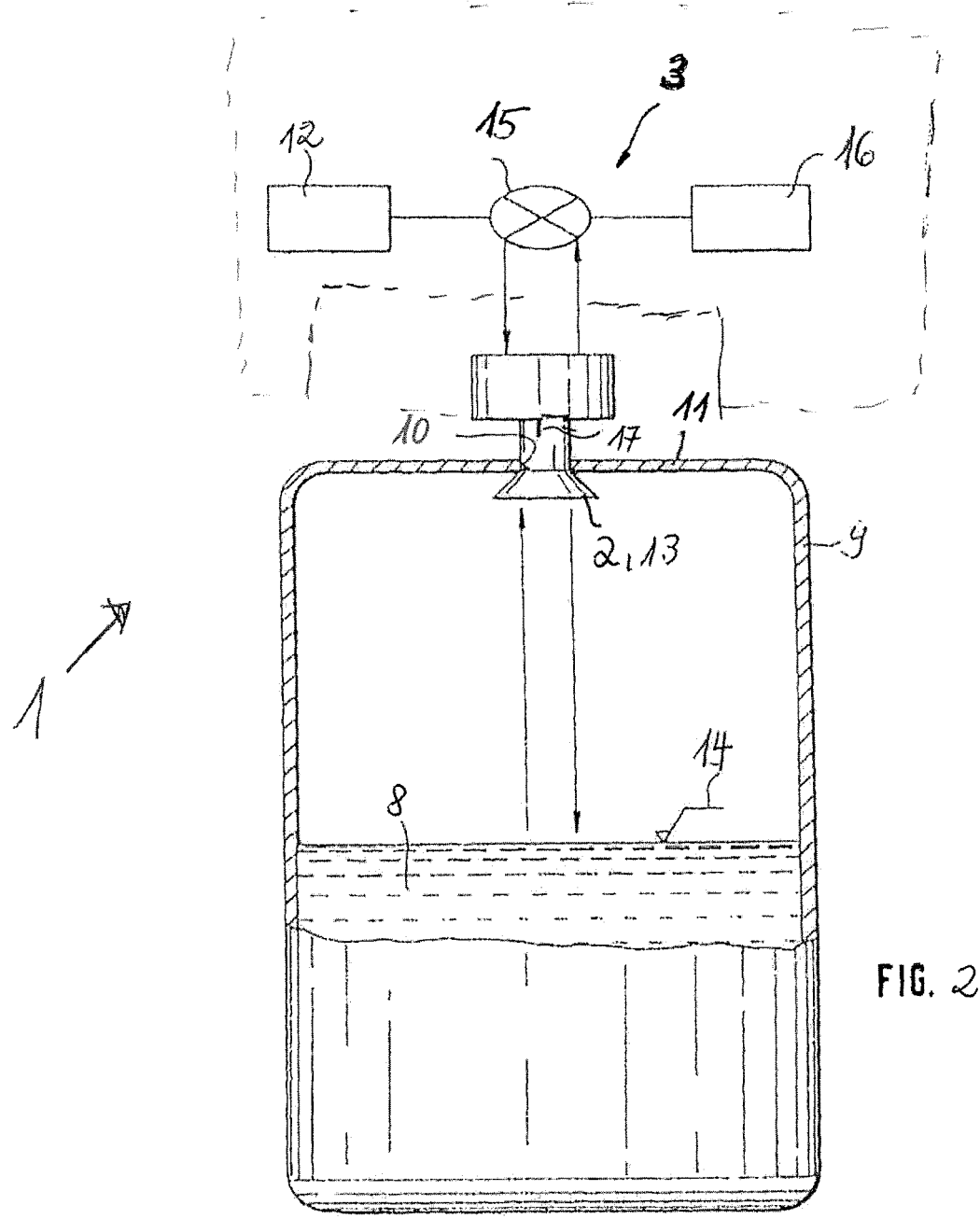
FIG. 2 is a schematic representation of a preferred embodiment of the apparatus of the invention, which serves for fill level measurement in a container.

FIG. 2 shows a schematic representation of an embodiment of the apparatus of the invention in the form of a radar fill-level measuring device 1. Although the invention will be described exclusively based on the radar-fill level measuring device 1, the solution of the invention is applicable in any form of field device of automation technology—especially when the field device should be suitable for use in a high temperature region. A large number of different field devices are manufactured and sold by the applicant.

Figure 1:
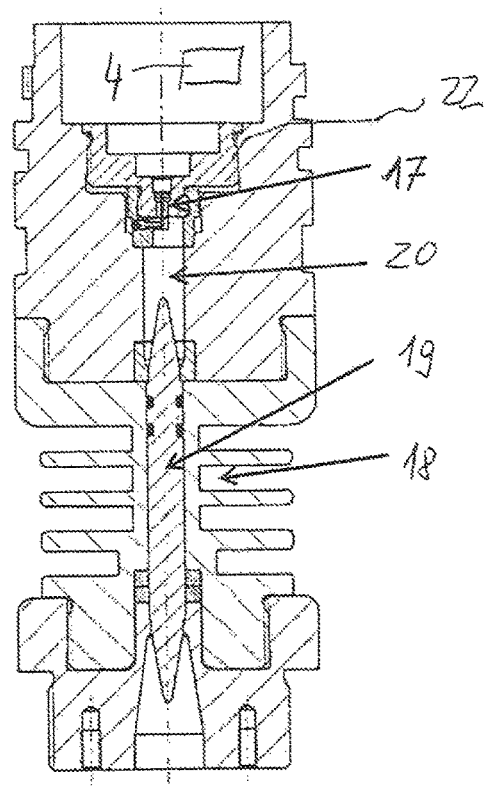
FIG. 1 is a detail view of a fill-level measuring device having a thermal decoupling connecting component of the state of the art.
Figure 3:
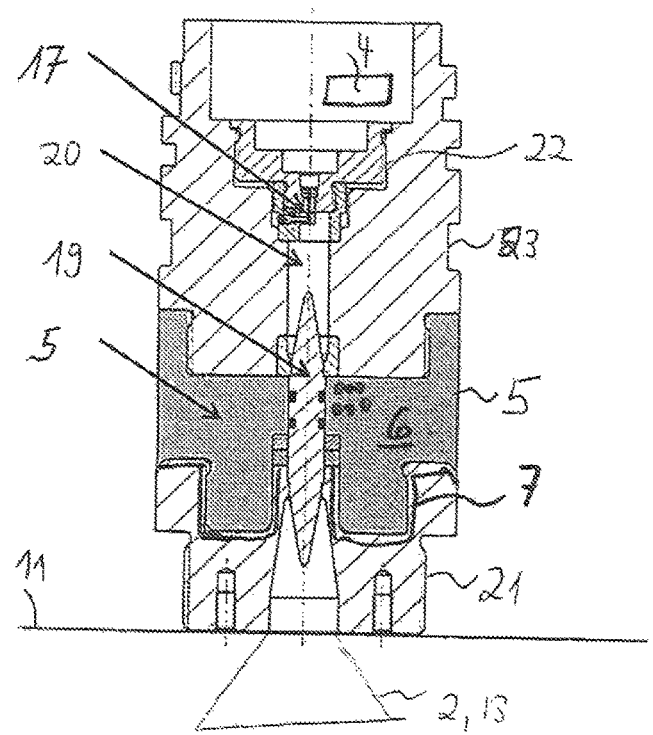
FIG. 3 is a detail view of a fill-level measuring device having a thermal decoupling connecting component of the invention.

The fill-level measuring device 1 shown in FIG. 2 serves for determining the fill level of a fill substance 8 in the container 9. FIG. 3 shows details of the portion of the fill-level measuring device 1 relevant to the invention.

The fill-level measuring device 1 is mounted in an opening 10 in the lid 11 of the container 9. Microwave measurement signals produced in the signal producing unit 12 are coupled via a coupling unit 17 into the hollow conductor 20 of the antenna unit 2 and via the antenna 13 radiated in the direction of the surface 14 of the fill substance 8. The measurement signals are at least partially reflected as echo signals on the surface 14 of the fill substance 8. The echo signals are received by the antenna unit 2 and supplied to a control/evaluation unit 16 for the purpose of conditioning and evaluating fill level measured values. Preferably, a travel time principle is applied. Associated with the control/evaluation unit 16 is a delay circuit such as described, for example, in DE 31 07 444 A1. The correct sequencing of transmission of the measurement signals and receipt of the echo signals occurs via the transmitting-receiving separator, or directional coupler, 15. The components 12, 15, 16 are parts of the so-called measurement transmitter 3 and are usually arranged in a measurement transmitter housing (not shown). The usually accretion- and pressure sensitive components 12, 15, 16 of the measurement transmitter 3 are protected from negative influences of the process by the two process isolations 19, 22. The process isolation 19 facing the process is occasionally exposed to high temperatures and/or high pressures and is composed, consequently, preferably of a ceramic material. The glass feedthrough 22, which is arranged in front of the electronics unit 3, respectively the measurement transmitter, blocks migration of substances from the process.

Located in the measurement transmitter 3 are usually electronic components 4, which only function correctly below or above predetermined temperature limit values. If these temperatures sensitive components 4 are exposed to a temperature, which lies below or above the specification limits, the components are destroyed. The connecting component 5 of the invention serves thermally to decouple the electronic components 4 of the transmitter 3 from the sensor element 2, which is exposed to the process conditions. Connecting component 5 is used instead of the temperature reduction unit known from the state of the art.

According to the invention, connecting component 5 is arranged between the sensor element and the electronics unit 3. The connecting component 5 is composed at least partially of a metal- or ceramic foam 6 having a predetermined porosity. In such case, the porosity of the metal- or ceramic foam 6 is so selected that the connecting component 5 has a predetermined thermal conductivity. Furthermore, the porosity of the metal- or ceramic foam 6 is so selected that the connecting component 5 has a predetermined mechanical stability. The connecting component 5 must be so designed that it withstands the process conditions reigning in the process. Since the thermal decoupling occurs largely not via an increasing of the longitudinal extent of the sensor element, the field device of the invention is distinguished by a compact form of construction.

The fill-level measuring device 1 is secured via the process connection 21 in an opening 10 located in the lid 11 of the container 9. Thus, the sensor element 2, respectively the antenna, is arranged in the process and, consequently, exposed to the process temperature and the process pressure. The electronics unit 3 with the at least one temperature sensitive component 4 is located outside of the process and is therewith exposed to environmental conditions. The porosity of the connecting component 5 is so selected that the sensor element 2 and the electronics unit 3 are thermally decoupled from one another in such a manner that the temperature sensitive component 4 always experiences a temperature, which lies within its specified temperature range.

The connecting component 5 is composed of a closed pore metal- or ceramic foam 6, or it is composed of an open pore metal- or ceramic foam 6, wherein the open pore metal- or ceramic foam body 6 is provided with a protective layer 7. To be noted in such case is that a low thermal conductivity of the connecting component 5 is achieved via a high gas fraction in the material of the connecting component 5.

Alternatively, at least one surface region of the connecting component 5 facing the process is provided with a protective layer 7 of a metal or a ceramic. Also, the protective layer 7 can be a closed pore metal- or ceramic foam 6. The protective layer prevents migration of particles of the fill substance 8 or of the process through the connecting component 5.

The invention claimed is:

1. An apparatus for determining or monitoring a physical or chemical, process variable, comprising:
   a sensor element having at least one temperature sensitive sensor region; and/or
   an electronics unit having at least one component, whose specification requires use within a predetermined temperature range; and
   a connecting component provided between said temperature sensitive sensor region and the remaining regions of said sensor element, and/or between said sensor element and said electronics unit, wherein:
   said connecting component is composed at least partially of a metal or ceramic foam having a predetermined porosity;
   said connecting component is composed of an open pore metal-or ceramic foam; and
   at least one surface region of said connecting component facing the environment is provide with a protective layer of a metal or a ceramic, or said protective layer is composed of a closed pore metal-or ceramic foam.

2. The apparatus as claimed in claim 1, wherein:
   the porosity of said metal- or ceramic foam is so selected that said connecting component has a predetermined thermal conductivity.

3. The apparatus as claimed in claim 1, wherein:
   the porosity of said metal- or ceramic foam is so selected that said connecting component has a predetermined mechanical stability.

4. The apparatus as claimed in claim 1, wherein:
   said sensor element is arranged in an application of process automation technology and is exposed to the process temperature;
   said electronics unit or the temperature sensitive, sensor region is arranged outside of the process and therewith is exposed to a temperature different from the process temperature; and
   the porosity of said connecting component is so selected that said sensor element and said electronics unit, respectively said sensor element and the temperature sensitive, sensor region, are thermally decoupled from one another in such a manner that said temperature sensitive component, respectively the temperature sensitive, sensor region, experiences a temperature, which lies in the specified temperature range.

5. The apparatus as claimed in claim 1, wherein:
   said connecting component is composed of a closed pore metal- or ceramic foam.

* * * * *